G. REMNSNIDER.
MACHINE FOR FITTING PUNCHES AND DIES.
APPLICATION FILED AUG. 4, 1920.
1,431,253.
Patented Oct. 10, 1922.
2 SHEETS—SHEET 1.
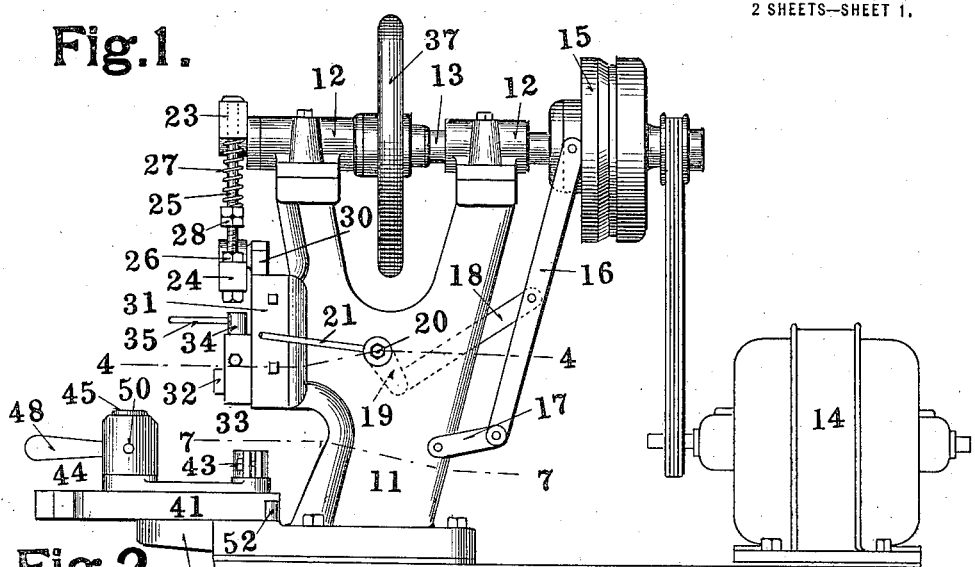
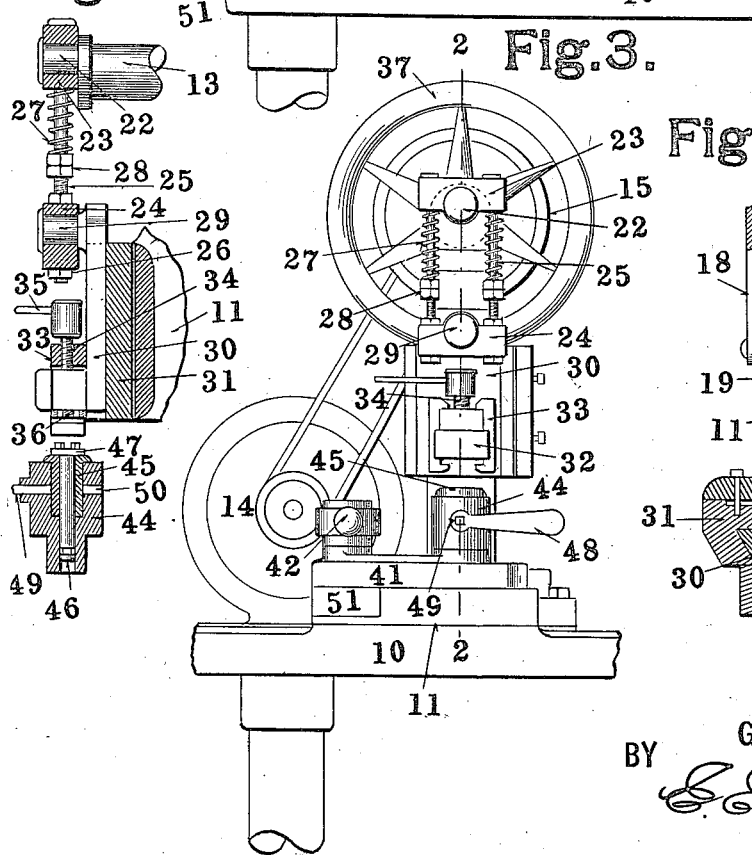
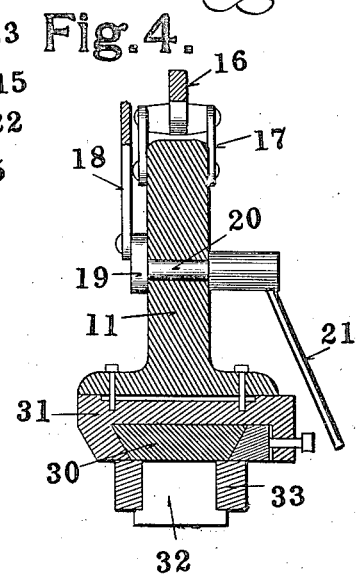
INVENTOR
GEO. REMNSNIDER
BY
ATTORNEY G. REMNSNIDER.
MACHINE FOR FITTING PUNCHES AND DIES.
APPLICATION FILED AUG. 4, 1920.
1,431,253.
Patented Oct. 10, 1922.
2 SHEETS—SHEET 2.
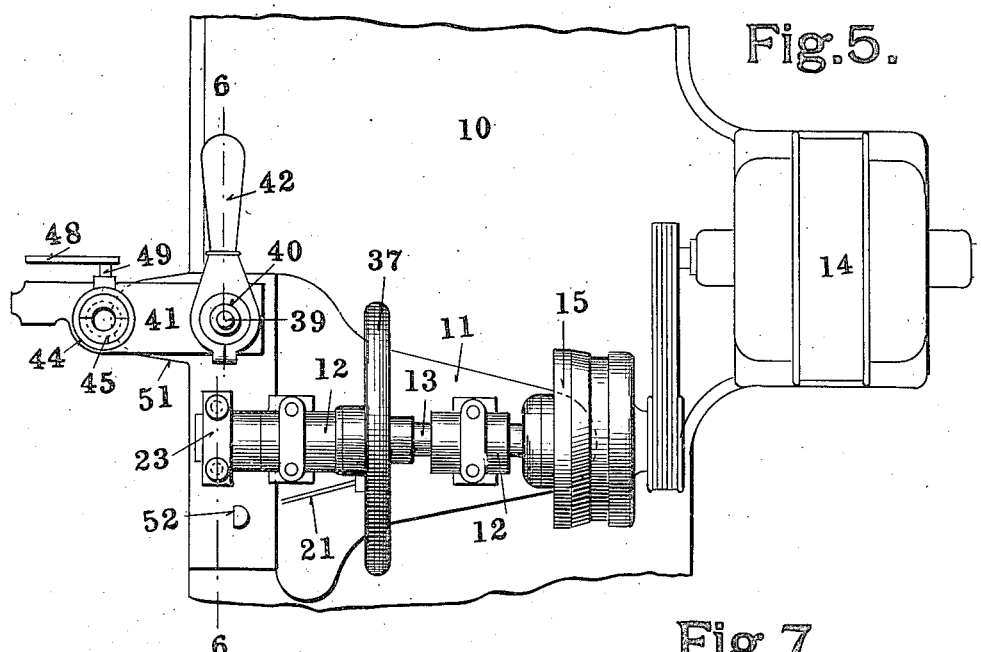
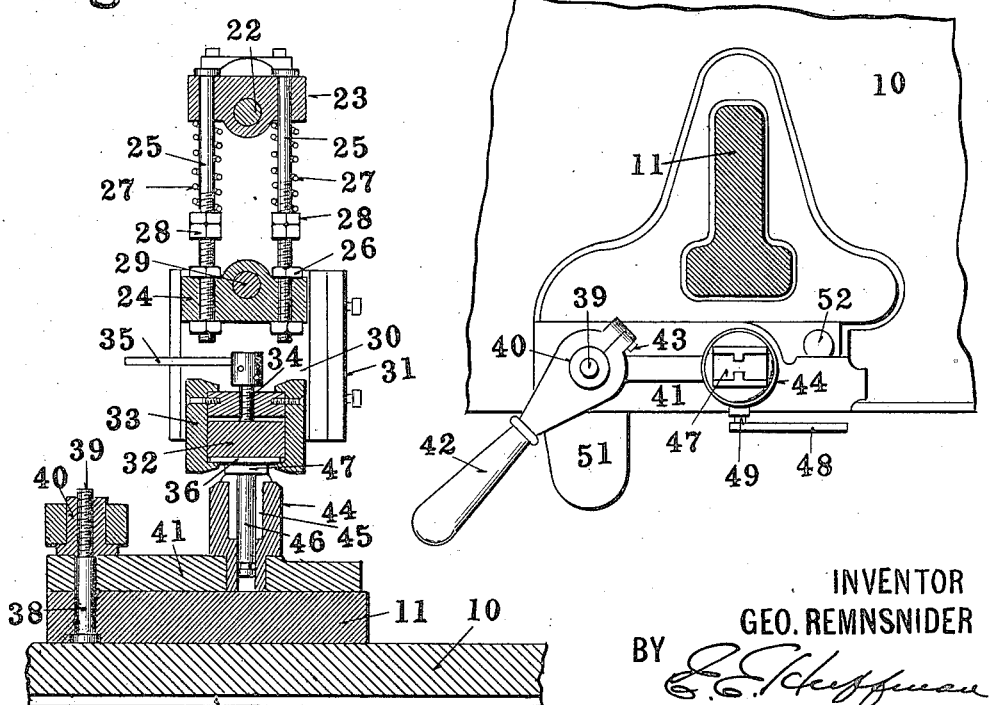
INVENTOR
GEO. REMNSNIDER
BY
ATTORNEY Patented Oct. 10, 1922.

1,431,253

UNITED STATES PATENT OFFICE.

GEORGE REMNSNIDER, OF BELLEVILLE, ILLINOIS.

MACHINE FOR FITTING PUNCHES AND DIES.

Application filed August 4, 1920. Serial No. 401,208.

*To all whom it may concern:*

Be it known that I, GEORGE REMNSNIDER, a citizen of the United States of America, residing at Belleville, county of St. Clair, State of Illinois, have invented a certain new and useful Machine for Fitting Punches and Dies, of which the following is such a full, clear, and exact description as will enable any one skilled in the art to which it appertains to make and use the same, reference being had to the accompanying drawings, forming part of this specification.

My invention relates to a machine for fitting punches and dies and more particularly for fitting punches and dies such as are used in stencil cutting machines.

In making punches for stencil machines, the punch is formed by welding or brazing to a suitable backing piece the parts separated from the die when making a character therein. This may be accomplished in the manner set forth in Patent No. 1,890,724 granted to me March 10, 1914, or any other suitable manner. The die is now relieved and hardened. Both these operations may somewhat change the form of the die. It is, therefore, necessary to fit the punch to the die after the die is hardened to secure perfectly smooth cutting contact between the punch and die. The object of my invention is to produce a machine by means of which the fitting operation may be accurately and rapidly accomplished. With this end in view, my machine is so constructed that the hardened die may be applied to the punch which is left soft so as to shear away any superfluous material and so that the punch and die may be disengaged to upset any part of the punch which is deficient in material and also to so hold the punch that it may be presented to the operator at different angles in order not only to facilitate the use of the hammer in upsetting portions of the punch but also particularly to enable the operator to smooth the facing of the die with a file.

In the accompanying drawings which illustrate one form of machine made in accordance with my invention, Fig. 1 is a side elevation, Fig. 2 is a section, on a slightly enlarged scale, taken on the line 2—2 of Fig. 3. Fig. 3 is a front elevation. Fig. 4 is an enlarged section taken on the line 4—4 of Fig. 1. Fig. 5 is a top plan view. Fig. 6 is a section taken on the line 6—6 of Fig. 5. Fig. 7 is an enlarged section taken on the line 7—7 of Fig. 1.

10 indicates a bench or table upon which the machine is carried. 11 is a casting forming the frame work of the machine and provided with a pair of bearings 12 in which is journaled the operating shaft 13. This shaft 13 is driven from any suitable source of power, such, for instance, as a motor 14 carried on the table 10. 15 is a friction clutch for throwing the motor 14 into and out of operative connection with the shaft 13. The clutch 15 is operated by an arm 16 pivoted at its lower end to frame 11 by links 17. Pivoted near the center of the arm 16 is one end of a link 18, the opposite end of which is pivoted to a crank arm 19 carried by a stud 20 journaled in the frame 11 and provided with an operating handle 21.

Carried at the forward end of the operating shaft 13 is a wrist pin 22 engaged by a bearing block 23. The bearing block 23 is connected with a second bearing block 24 by a pair of rods 25 rigidly secured to block 24 by means of nuts 26, but having sliding connection with the block 23. Blocks 23 and 24 are normally positioned a fixed distance apart by means of coil springs 27 surrounding the rods 25 and bearing at one end against the block 23 and at the other against adjusting nuts 28 by means of which tension of the springs may be varied. The bearing block 24 engages with a stud 29 carried on a sliding plate 30. The plate 30 is mounted in a guide block 31. The sliding plate 30 is provided with a forwardly projecting T-shaped clamping member 32, as best shown in Fig. 4. The clamping member 32 is engaged by a clamping yoke 33 operated by means of a screw 34 provided with a handle 35. The die 36 is adapted to be clamped between yoke 33 and block 32 as shown in Fig. 6 of the drawings when the handle 35 is operated to tighten screw 34. A hand wheel 37 on the shaft 13 serves to operate the sliding member manually to position the same to receive the die as will be hereinafter described.

Carried by the frame 11 of the machine is a stud 38, as best shown in Fig. 6. This stud 38 is provided at its upper end with a threaded portion 39 engaged by locking nut 40 and forms the pivot for a laterally swinging punch holding member 41. The locking nut 40 is engaged by an operating handle 42 which may be adjusted upon the nut by means of a clamping screw 43. Carried by member 41 is a cylindrical boss 44 provided with a split collar 45 adapted to engage the stem 46 of the punch 47. 48 is a handle operating a screw 49 to force the two parts of the split collar 45 together to clamp the punch stem in position. An adjusting screw 50, Fig. 2, is used to vary the distance between two parts of the clamping collar 45 so that the arm 48 may be in substantially horizontal position as shown in Fig. 3 when the punch stem is clamped. This obviates the possibility of the handle 48 interfering with the proper tooling of the punch. A forwardly projecting member 51 serves to support the punch holder 41 when it is thrown into position, as shown in Fig. 5 of the drawing, for hand tooling. A stop 52 limits the movement of the punch holder 41 and thus insures the alignment of the punch and die.

The operation of my device is as follows:

The punch holder 41 being swung into position shown in Fig. 5 of the drawing, the punch stem 46 is inserted into the split collar 45 and firmly clamped in position by operating the handle 48. The die 36 is now placed upon the punch and forced into position by hammering or otherwise. The sliding member 30 is now moved into its lowest position, by means of the hand wheel 37. The screw 34 is operated by the handle 35 to separate the lower part of the clamping yoke from the clamping block. The member 41 is now swung into position to bring the die 36 between the clamping yoke and clamping block, the movement of the member 41 being arrested by the stop 52. The handle 42 is now operated to lock the member 41 in position and the handle 35 operated to clamp the die between the clamping yoke 33 and the clamping block 32. The handle 21 is now operated to throw the motor into engagement with the driving shaft to actuate the member 30. This member together with the die is rapidly reciprocated to cause the fitting of the punch and die. The springs 27 imparts yielding pressure to the die and thus accomplishes a gradual fitting of the die upon the punch. During the fitting of the punch and die, the machine may be stopped at any time by the movement of the handle 21 and the punch holder swung outward into position shown in Fig. 5 so that the punch may be operated on by hand tools. When it is again swung into operative position it will register exactly with the die so that mechanical fitting operation may be resumed.

Having fully described my invention, what I claim as new and desire to secure by Letters Patent of the United States is:

1. In a device of the class described, the combination with a reciprocating die holder, of a trimming die carried thereby, a laterally movable punch holder for positioning the punch either under the die to be trimmed thereby or to one side thereof, and means for locking said holder in said latter position for hand tooling the punch.

2. In a device of the class described, the combination with a reciprocating die holder, of a trimming die carried thereby, a pivoted punch holder adapted to be swung laterally to position the punch either under said die to be trimmed thereby or to one side thereof, and means for locking said holder in said latter position for hand tooling the punch.

3. In a device of the class described, the combination with a sliding member, of means for reciprocating said sliding member, a clamping yoke carried by said sliding member and adapted to engage with a trimming die, and a laterally movable punch holder adapted to engage with a punch stem and to present a punch and attached die to said clamping yoke, whereby the latter may clamp the die while in engagement with the punch to secure proper trimming relation of the parts.

4. In a device of the class described, the combination with a sliding member, of means for reciprocating said sliding member, a clamping yoke carried by said sliding member and adapted to engage with a trimming die, and a punch holder pivoted on a vertical axis and adapted to present a punch and attached die to said clamping yoke, said axis being arranged at one side of the holder whereby the punch is presented to the operator at different angles as it swings away the die holder.

5. In a device of the class described, the combination with a die holder, of means for reciprocating said die holder, a pivotally mounted punch carrying member, means operating on the pivot of said member for holding it in position, and a clamp carried by said punch holding member and adapted to present a punch and attached die to the die holder.

6. In a device of the class described, the combination with a die holder, of means for reciprocating said holder, a pivoted punch carrying member, means operating on the pivot of said member for holding it in position, and a split sleeve carried by said punch holding member and adapted to engage with a punch to present said punch and attached die to said die holder.

In testimony whereof, I have hereunto set my hand and affixed my seal.

GEORGE REMNSNIDER.